US007880935B2

(12) United States Patent
Maruta et al.

(10) Patent No.: US 7,880,935 B2
(45) Date of Patent: Feb. 1, 2011

(54) STORED INFORMATION PROCESSING DEVICE FOR EXTERNAL STORAGES, AND STORED INFORMATION PROCESSING METHOD

(75) Inventors: Syuji Maruta, Toyokawa (JP); Masazumi Ito, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1386 days.

(21) Appl. No.: 11/020,178

(22) Filed: Dec. 27, 2004

(65) Prior Publication Data
US 2006/0077424 A1    Apr. 13, 2006

(30) Foreign Application Priority Data
Oct. 8, 2004    (JP)    ............... 2004-296754

(51) Int. Cl.
H04N 1/04    (2006.01)
(52) U.S. Cl. .............. 358/404; 358/474; 358/496; 358/497
(58) Field of Classification Search .......... 358/404, 358/474, 496, 497, 1.16
See application file for complete search history.

(56) References Cited
U.S. PATENT DOCUMENTS
RE39,213 E * 8/2006 Anderson et al. ...... 348/231.99

FOREIGN PATENT DOCUMENTS
JP    61-278989    12/1986
JP    05-336320    12/1993
JP    2003-058425    2/2003
JP    2004-272457    9/2004

OTHER PUBLICATIONS

Japanese Office Action mailed on Jul. 22, 2008 directed at counterpart foreign application JP-2004-296754; 6 pages.
Notification of Reason for Refusal, mailed Sep. 4, 2007, directed to corresponding Japanese Patent Application No. 2004-296754.

* cited by examiner

*Primary Examiner*—Houshang Safaipour
(74) *Attorney, Agent, or Firm*—Morrison & Foerster LLP (57) ABSTRACT

A stored information processing device for external storages, comprises a plurality of connecting portions for connecting a plurality of external storages in a detachable manner, a stored information reading portion capable of reading stored information of the external storage connected to the connecting portion, a display portion capable of displaying the stored information of the external storage read by the stored information reading portion, a detection portion for detecting a connection and/or disconnection of the external storage with respect to any one of the connecting portions of the external storage, a discrimination portion for discriminating whether, when a connection and/or disconnection of the first external storage with respect to any one of the connecting portions, a second external storage is connected to the other connecting portion, and a controller for determining whether the stored information of the first and/or second external storage is displayed on the display portion depending on a discrimination result.

14 Claims, 11 Drawing Sheets

STORED INFORMATION PROCESSING DEVICE FOR EXTERNAL STORAGES, AND STORED INFORMATION PROCESSING METHOD

This application claims priority under 35 U.S.C. §119 to Japanese Patent Application No. 2004-296754 filed on Oct. 8, 2004, the entire disclosure of which is incorporated herein by reference in its entirety.

BACKGROUND OF THE INVENTION

1. Field of the Invention

The present invention relates to a stored information processing device for external storages for processing storage information stored in a detachably connectable external storage, such as a USB (Universal Serial Bus) memory. It also relates to a stored information processing method.

2. Description of the Related Art

The following description sets forth the inventor's knowledge of related art and problems therein and should not be construed as an admission of knowledge in the prior art.

Conventionally, in facsimile apparatuses or the like, it is known by Japanese Unexamined Laid-open Patent Publication No. 5-336320 to constitute such that an external storage, such as a memory card, an optical disk and a flexible disk, can be connected in a detachable manner so that a FAX received image can be stored in this external storage, or the received image can be printed again when the external storage is connected thereto.

In the meantime, in a MFP (Multi Function Peripherals) which is one of image forming apparatuses and has a printer function, a copy function, a FAX function, a scanner function, etc., there has been proposed to constitute such that a plurality of USB memories capable of being inserted into a standardized insertion slot can be connected as external storages.

In MFPs having insertion slots for connecting a plurality of USB memories, there will be possibilities that job registered users use with a plurality of USB memories connected to the MFP and that next different users wait for their turn with their USB memories connected to the MFP.

In cases where the aforementioned conventional known technology is applied to a MFP to which a plurality of USB memories can be connected, as a method for specifying storage information, such as an image that a user wants to output, it can be considered for the user to print by specifying the USB memory. However, in this case, it is required for the user to select the storage information from a plurality of USB memories. This operation is troublesome.

Furthermore, if it is configured to display the storage information in USB memories of other users without the other user's permission, security will be spoiled for other users.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a memory information processing device for external storages capable of enhancing selection operability of storage information when a plurality of external storages are connected while securing security on storage information stored in other users' external storages.

Among other potential advantages, some embodiments can provide a memory information processing method for external storages capable of enhancing selection operability of storage information when a plurality of external storages are connected while securing security on storage information stored in other users' external storages.

According to a first aspect of the preferred embodiment of the present invention, a stored information processing device for external storages, comprise:

a plurality of connecting portions for connecting a plurality of external storages in a detachable manner;

a stored information reading portion capable of reading stored information of the external storage connected to the connecting portion;

a display portion capable of displaying the stored information of the external storage read by the stored information reading portion;

a detection portion for detecting a connection and/or disconnection of the external storage with respect to any one of the connecting portions;

a discrimination portion for discriminating whether, when a connection and/or disconnection of a first external storage with respect to any one of the connecting portions is detected by the detection portion, a second external storage is connected to the other connecting portion; and a controller for determining whether the stored information of the first and/or second external storage is displayed on the display portion depending on a discrimination result.

According to a second aspect of the preferred embodiment of the present invention, a stored information processing device for external storages, comprises:

a plurality of connecting portions for connecting a plurality of external storages in a detachable manner;

a stored information reading portion capable of reading stored information of the external storage connected to the connecting portion;

an internal storage portion having an exclusive storage area for storing the stored information of the external storage read by the reading portion;

a detection portion for detecting a connection of the external storage with respect to any one of the connecting portions;

a discrimination portion for discriminating whether, when a connection of a first external storage with respect to any one of the connecting portions is detected by the detection portion, a second external storage is connected to the other connecting portion; and a transfer portion for transferring the stored information of the first external storage to an exclusive area of the internal storage portion to store the stored information therein when it is discriminated that the second external storage is already connected.

According to a third aspect of the preferred embodiment of the present invention, a stored information processing method for external storages, comprises:

a detecting step of detecting a connection and/or disconnection of a first external storage with respect to any one of connecting portions of a stored information processing device having a plurality of connecting portions;

a discrimination step of discriminating whether, when the connection and/or disconnection of the first external storage is detected by the detection step, a second external storage is connected to another connecting portion;

a display control step of determining whether the stored information of the first and/or second external storage is displayed on a display portion depending on the discrimination result; and a display step of displaying the stored information of the first and/or second external storage determined to be displayed at the display control step on a display portion.

According to a fourth aspect of the preferred embodiment of the present invention, a stored information processing method for external storages, comprising:

a detection step of detecting a connection of a first external storage to any one of connecting portions of a stored information processing device having a plurality of connecting portions;

a discrimination step of discriminating whether a second external storage is already connected to another connecting portion when a connection of the first external storage is detected by the detection step; and a transfer step of transferring the stored information of the first external storage to an exclusive storage area of an internal storage portion to save the stored information therein when it is discriminated by the discrimination step that the second external storage is already connected.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[Entire MFP Structure]

Figure 1:
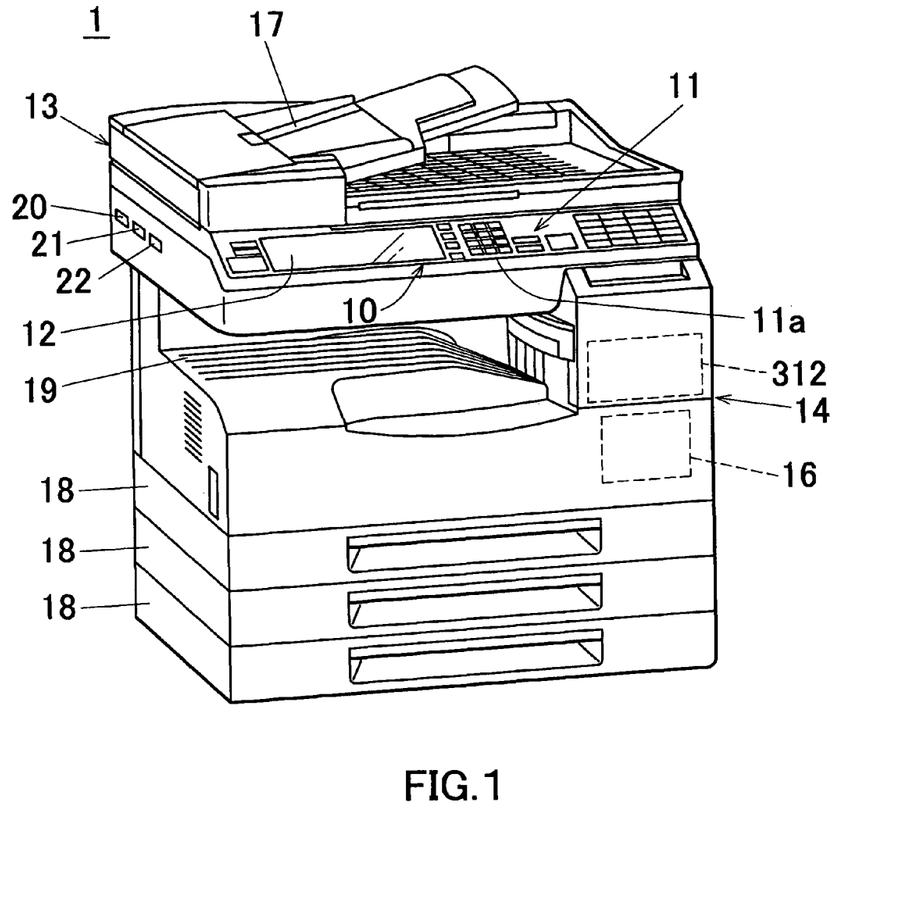
FIG. 1 is a perspective view showing a MFP to which a memory information processing device for external storages according to an embodiment of the present invention is applied.

FIG. 1 is a perspective view showing a MFP as an image forming apparatus to which a memory information processing device according to one embodiment of the present invention is applied.

Figure 2:
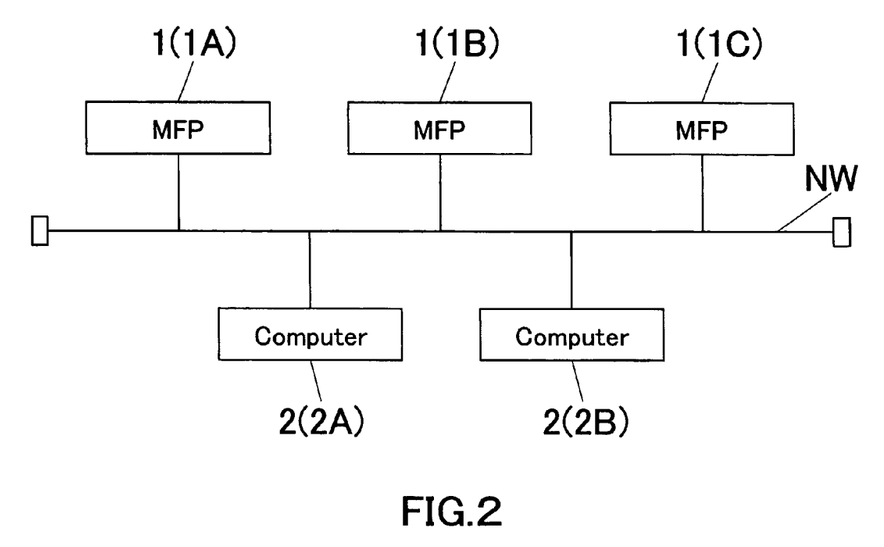
FIG. 2 is a block diagram showing a network environment of the MFP.

In FIG. 1, the MFP 1 is a digital complex machine having a copy function, a print function, a facsimile function, a scanner function, etc., and is capable of transmitting and receiving data between user terminals, etc. via a network NW (see FIG. 2).

The MFP 1 has insertion ports 20, 21 and 22 as connecting portions to which a plurality of (three in this embodiment) USB standardized external equipments are connected. When external equipments each having a USB interface, such as USB memories 320, 321 and 322 (see FIG. 3) which are external storages, are connected to the insertion ports 20, 21 and 22, data transmission and reception becomes possible between the external equipments and the MFP 1. Hereafter, the insertion port 20, 21 and 22 will be referred to as a "USB port" or "USB connector."

The MFP 1 is provided with a control panel 10. This control panel 10 has a plurality of keys 11a, an operation portion 11 which receives various kinds of instructions made by user operations to the keys 11a or entries of data, such as characters and numbers, a display 12 made of liquid crystal which displays instructions menu to users or information about the acquired image, etc.

The MFP 1 is provided with a scanner portion 13 which reads an original document optically to obtain the image data, and a printer portion 14 which prints an image on a record sheet based on the image data.

On the upper surface of a main body of the MFP 1, a feeder portion 17 for sending an original document to the scanner portion 13 is provided. At the lower portion, a paper feeding portion 18 for supplying recording sheets to the printer portion 14 is provided. Further provided at the central portion are a tray 19 on which the recording sheet on which an image was printed by the printer portion 14 is discharged. Furthermore, provided in the interior of the main body of the MFP 1 are a communication portion 16 for transmitting and receiving image data, etc. between the MFP and external equipments via a network NW, and a storage portion 312 which stores image data, etc.

The MFP 1 has a network interface, so that the communication portion 16 is connected to the network NW via the network interface so as to be able to exchange various data between the MFP and external equipments.

The display 12 is used to display various information including destination lists of data transmission. The operation portion 11 is used for various inputs including a selection of destination by a user. They function as a principal part of the user interface.

The scanner portion 13 acquires image data by photoelectrically reading image information, such as photographs, characters, pictures, from an original document. The acquired image data (concentration data) is changed into digital data in the image processing portion (not illustrated), and subjected to various well-known image processing. Thereafter, the processed data is sent to the printer portion 14 or the communication portion 16 to be printed or transmitted, or stored in a storage portion 23 for the next use.

The printer portion 14 prints an image on a recording sheet based on image data acquired by the scanner portion 13, image data received from an external equipment by the communication portion 16, or image data stored in the storage portion 23.

The communication portion 16 transmits and receives facsimile data via a dial-up line, and also transmits/receives data via networks NW, such as LANs and the Internet, by using an E-mail, etc.

Thus, the MFP 1 has not only a function as a facsimile apparatus for performing a usual facsimile communication but also a function as a transmitting/receiving terminal of an E-mail. Therefore, various image data can also be transmitted and received as an attached file of an E-mail. The network communication that the MFP 1 performs can be made by wire or radio. In the illustrated embodiment, a wire communication mode is adopted.

[Outline of Network]

FIG. 2 is an explanatory view showing an example of a network connection according to one embodiment of the present invention.

In FIG. 2, the network NW is constituted by personal computers (hereinafter also referred to as "PC") 2 (2A, 2B, . . . ) as a plurality of external equipments (terminals) which requires printing processing as a job, and a plurality of MFPs 1 (1A, 1B, 1C . . . ) which perform the aforementioned job. Here, it is supposed that each MFP 1 has a multi-job function.

The multi-job function means, in an image forming apparatus, such as a digital copier and a printer, which performs image formation using digitized image data, a function to be used for forming an image by digitally processing image data read using an image reader, etc., or a function capable of forming an image using image data transmitted from an external terminal of the PC 2 or the like connected to an image forming apparatus. A function which can acquire image data while performing image formation is also one of multi-job functions.

In an image forming apparatus provided with a multi-job function, an image formation using image data obtained from a bunch of original documents read by an image reader and/or an image formation using image data transmitted from PCs is treated as a job, respectively. And the image formation is performed one by one per a job unit.

That is, image data obtained by reading an original document and image data transmitted from a PC are stored in an image memory with corresponding job identifier (hereinafter "Job ID") of each job, while the job ID is registered into a predetermined administration table in order that each job was issued to the image forming apparatus. Then, image formation is performed in order of the job ID registered in the table.

[Electric Structure of the MFP 1]

Figure 3:
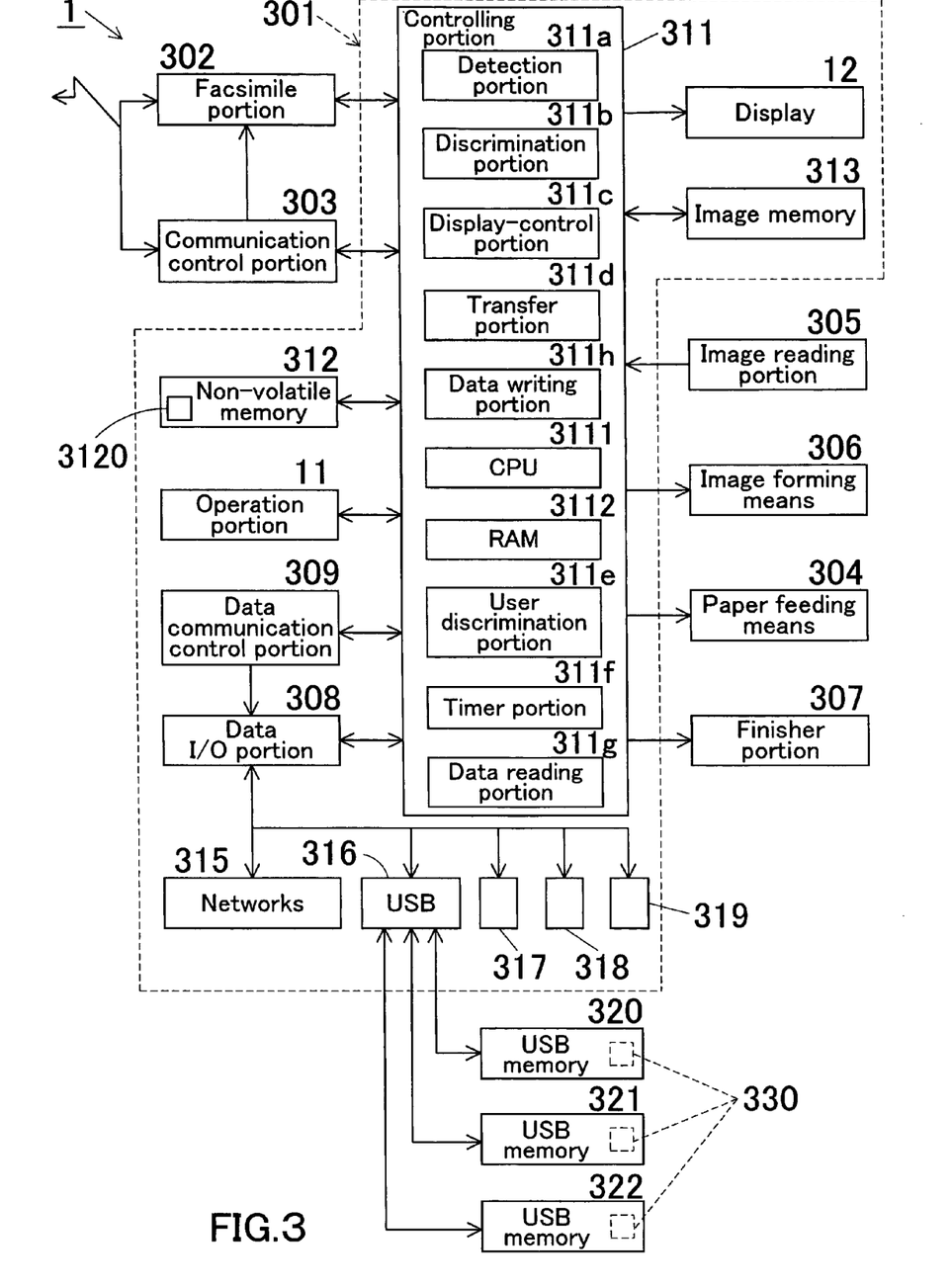
FIG. 3 is a block diagram showing an electric structure of the MFP.

FIG. 3 is a block diagram showing an electric structure of the MFP 1.

In FIG. 3, this MFP 1 has an information processing portion 301, a facsimile portion 302, a communication controller 303, a paper-feeding portion 304, an image reading portion 305 that constitutes the scanner portion 13, an image formation portion 306 which constitutes the printer portion 14, and a finisher portion 307.

This information processing portion 301 is an example of an information processing portion, and has a data I/O portion 308, a data communication controller 309, an operation portion 11, a control unit 311, a storage portion 312, an image memory 313, and a display 12. In the information processing portion 301, a control, such as a deletion or output of a job stored in the image memory 313 can be performed.

The control unit 311 has, e.g., a CPU 3111 and a RAM 3112. A data I/O portion 308 is connected to the control unit 311 so as to input and output a job.

This control unit 311 controls the entire MFP 1, and has the following functions in this embodiment.

That is, it functions as a detection portion 311a which detects that a USB memory 320 (321) (322) is connected to the USB port 20 (21) and (22) and/or that the connection state is released (pulled out of the insertion port).

It functions as a judging portion 311b which judges whether, at the time of connecting any one of USB memories 320 (321) (322), another USB memory 321 (322) is already connected, or judges whether, at the time of removing any one of USB memory 320 (321) (322), any other USB memories 320 (321) (322) are still connected.

It also functions as a display controller 311c which determines whether storage information in the USB memory 320 (321) (322) is to be displayed on the display 12 of the control panel 10 and performs other display controls depending on the judgment result of the judging portion 311b. Furthermore, it functions as a transfer portion 311d which transfers storage information in the USB memory 320 (321) (322) to an exclusive storage area (box) 3120 of the storage portion 312 to save therein when the judgment result of the judging portion 311b is a predetermined result.

Furthermore, the control unit 311 also functions as a user distinction portion 311e which discriminates whether an active user is the same about at least two USB memories 320 (321) (322).

In addition, the control unit 311 has a function of a timer portion 311f for measuring a time period from the time of detecting a connection of the USB memory 320 (321) (322) to the time of detecting a new connection of another USB memory 321 (322). The time measurement discriminates whether a predetermined time has passed using a timer in this embodiment based on whether the timer is up.

Concrete operations of each function by the aforementioned control units 311 will be mentioned later.

The data I/O portion 308 is provided with a plurality of interface (I/F) terminals, such as a LAN (Local Aria Network) terminal 315 of a TCP/IP base network, a USB terminal 316, a Centronics terminal 317, a serial interface terminal 318, and/or a JTAG terminal 319.

In the state in which the data I/O portion 308 is connected to the network terminal 315, the USB terminal 316, the Centronics terminal 317, the serial interface terminal 318, or the UTAG terminal 319, it becomes possible to perform reading, writing and deleting data by the control unit 311.

The storage portion 312 is comprised of a nonvolatile memory, such as a hard disk, and has the aforementioned exclusive storage area (box) 3120 for saving image data, etc.

In the image memory 313, it is possible to copy an image between memories.

The CPU 3111 makes the control unit 311 operate so as to demonstrate controls and functions mentioned above. Executing the program stored in the program storing portion (not shown), the CPU 3111 makes the control unit 311 operate. The RAM 3112 serves as a working area when the CPU 3111 performs a program.

In this embodiment, as mentioned above, there are a plurality of insertion ports as USB terminals 316 to which USB memories 320, 321 and 322 can be simultaneously connected. The control unit 311 can simultaneously perform the reading of each storage information to these plural USB memories 320, 321 and 322 and the writing of information to each USB memory 320, 321 and 322. The reading of storage information is performed by a data reading portion 311g of the control unit 311, and the writing of information is performed by a data writing portion 311h.

In this embodiment, the USB memory 320, 321 and 322 itself may be provided with an authentication portion 330 as a user identification portion. As this authentication portion 330, a fingerprint authentication portion can be used, for example. This fingerprint authentication portion 330 identifies the fingerprint of a user's finger, and performs comparison collating of the identified fingerprint and the fingerprint registered beforehand. The user distinction portion 311e of the control unit 311 can discriminate the active user's identity based on the authentication result, when the fingerprint authentication portion 330 is provided in the USB memory.

Of course, the authentication portion 330 can employ various kinds of authentication, such as authentication using a voiceprint, authentication based on a tool-force variation at the time of writing a character by a user, and authentication based on biometrics, such as a retina.

[Control Panel]

Figure 4:
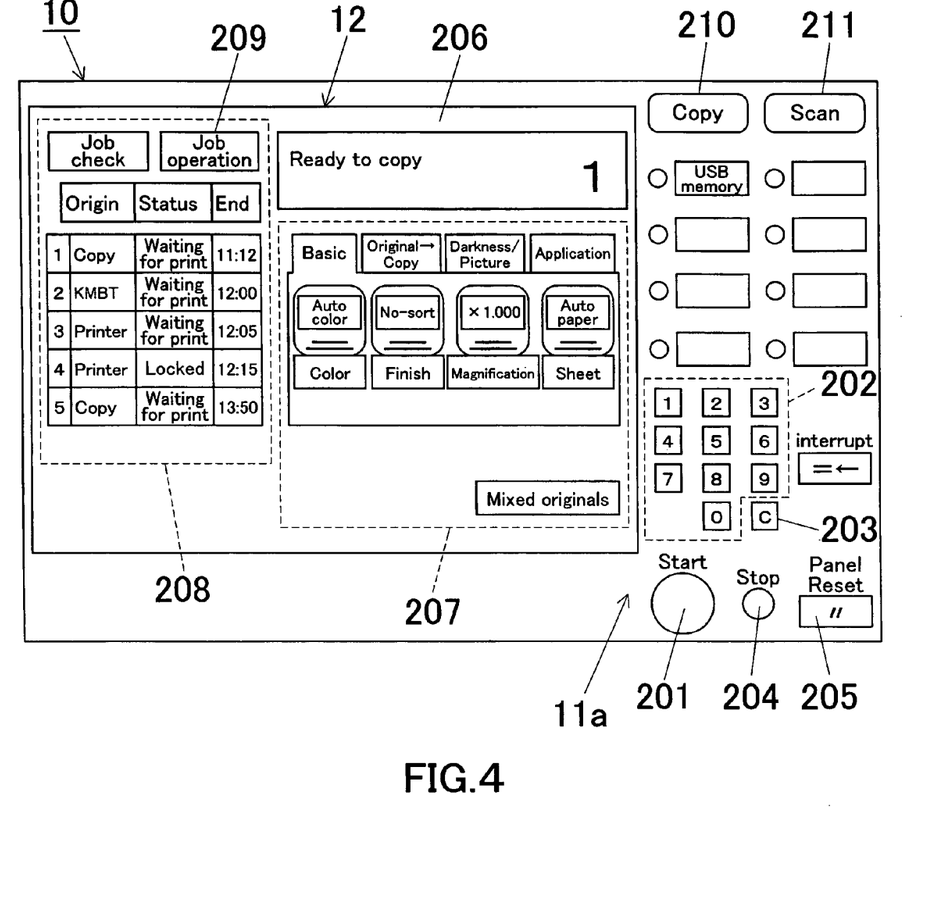
FIG. 4 is an explanatory drawing showing a display screen of a control panel.

FIG. 4 is a plan view showing a structure of the control panel 10 in the MFP 1.

In FIG. 4, the start key 201 is used to initiate the operation of a copy/facsimile transmission, etc. The ten key 202 is used to input numeric values, such as the number of copies to be made. The clear key 203 is used to clear the inputted numerals and delete accumulated image data of the image storage portion.

The stop key 204 is used to instruct suspension of copy/scan operations. The Panel Reset key 205 is used to cancel the set mode and job.

The display 12 displays various modes and is provided with the touch panel 206 on the surface thereof. With this touch panel 206, a user can perform various settings according to the display contents in the display 12. For example, when the setting screen of the user ID which is a user's identification information is displayed on the display 12, a user sets up the user ID using the various keys of the operation portion 11 and/or the touch button displayed on the display 12.

In the setting screen area 207 in the touch panel 206, usually, buttons for fundamental/applied settings for executing copy operations and/or facsimile send operations are arranged. When each button is touched, the hierarchy screen for performing the detailed settings will be displayed.

The job information screen area 208 of the touch panel 206 displays the current job information given to the MFP 1. The information is displayed in the order to be executed. In the case of deleting, changing, etc., a specific job, after the selection of the job manual operation button 209, the job number button to be operated is pressed. A job operation screen is displayed in accordance with the operations, and therefore it becomes ready to operate the specific job.

The copy key 210 and the scanning key 211 are selection keys for setting which of the copy mode or the scanner mode is to be selected to operate the MFP 1.

When the copy key 210 is pressed, the MFP 1 becomes ready to use as a copy machine. A scanning operation and facsimile send action cannot be performed in this state.

At this time, a display for performing various settings with respect to copy operations is appeared in the setting screen area 207 of the touch panel 206. A copy operation is initiated by setting an original document and pressing the start key 201 after the completion of various settings. When the scanning key 211 is pressed, the MFP 1 will be served as a scanner and facsimile. A copy operation cannot be performed in this state.

At this time, in the setting screen area 207 of the touch panel 206, various settings regarding the scanning operation/facsimile transmission is displayed. A scanning operation/facsimile send action is initiated by setting an original document and pressing the start key 201 after the completion of various settings.

The copy key 210 and the scanning key 211 serve as an exclusive operation, and if one of them is selected, another will be in a non-selected state automatically.

When a printing operation is to be performed using the MFP 1 from the PC 2, a printer control driver software is installed in the PC 2, and various settings for the printing operation is performed on a driver screen. Accordingly, it is not required to display any setting screen for printing and any print change keys on the control panel 10 of the MFP 1.

[Control Panel (File Selection in a USB Memory)]

Figure 5:
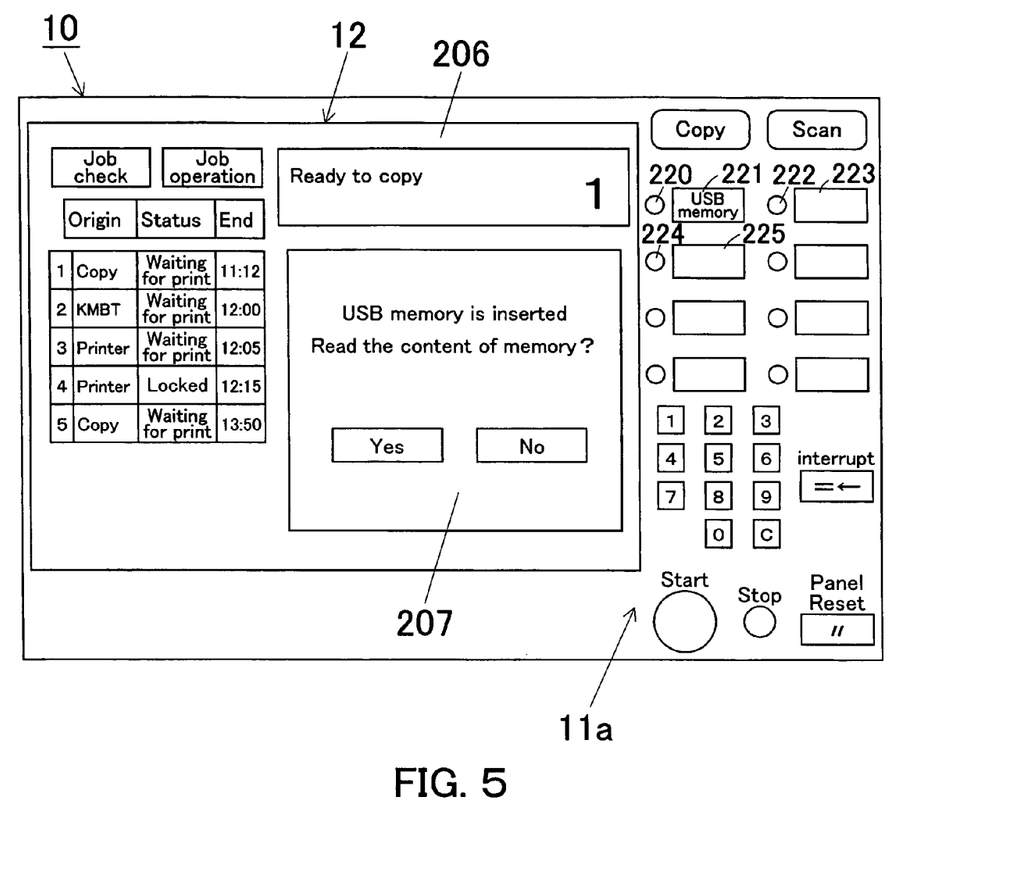
FIG. 5 is a user confirmation screen at the time of reading the storage information in the external storage.

FIG. 5 shows a user confirmation screen in case where the MFP 1 reads image data from USB memories 320, 321 and 322.

In FIG. 5, a USB memory 320 (321) (322) is connected to the USB port 20 (21)(22) of the MFP 1. If the USB memory reading key 221 is pressed, the setting screen area 207 will shift to a hierarchy of a USB memory reading confirmation screen.

In this screen, if the selection "Yes" for reading the contents' of the USB memory 320 (321) (322) is pressed (touched), the MFP1 accesses the USB memory 320 (321) (322) and performs processing for reading the contents of the USB memory 320 (321) (322).

The reference numerals 223 and 225 denotes reading keys whose operation becomes effective when a USB memory is inserted in the other USB ports, and the reference numerals 220, 222 and 224 denote light emitting diodes (LED) provided corresponding to the reading keys 221, 223 and 225.

Figure 6:
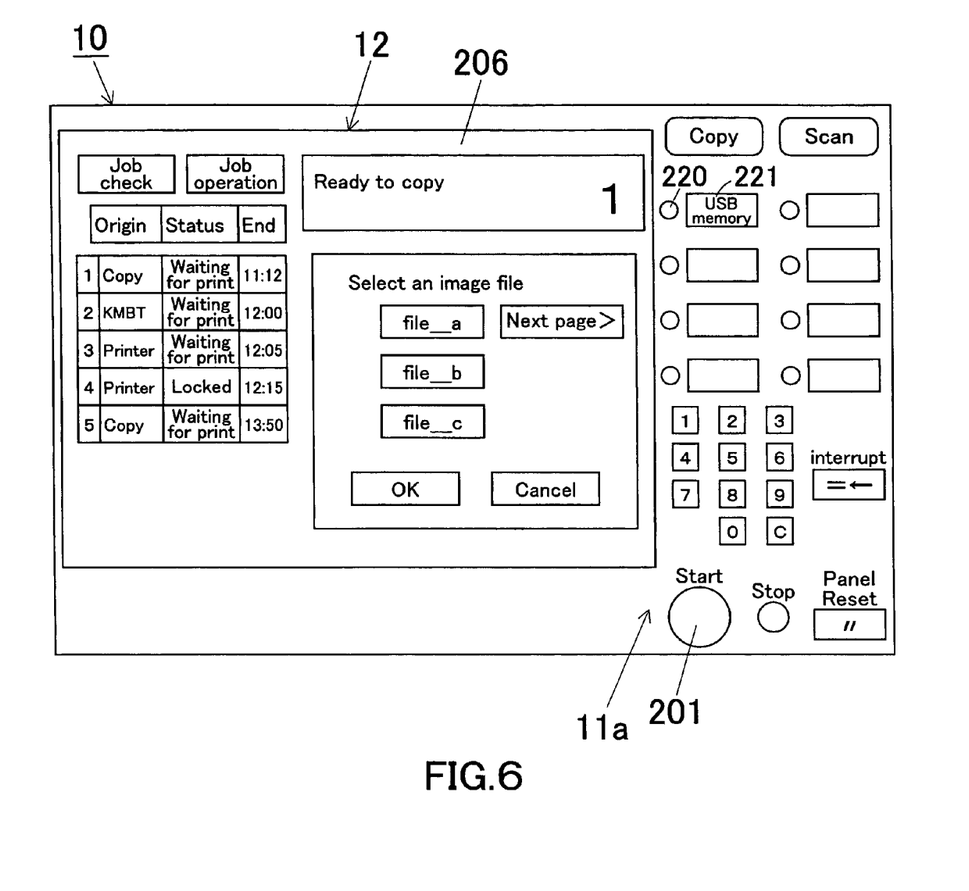
FIG. 6 shows a screen to be displayed when a user selects a storage information stored in an external storage.

When storage information (for example, image data) exists in the USB memory 320 (321) (322), as shown in FIG. 6, a panel display lists the image data existing in the memory, and selection of image data that a user desires becomes available. Furthermore, in cases where the number of data existing in a memory exceeds the hierarchy screen display, the remaining data will be displayed by pressing (touching) the "Next page" key.

If the "OK" key is pressed on this screen, the MFP 1 initiates the processing for reading a specified file. When data has been read normally, an LED 220 corresponding to the USB memory reading key 221 turns on to notify the user that image data was read from the USB memory 320 (321) (322).

After the selection of certain desired image data, when a user presses the start key 201, provided that the copy function is selected, a control for scanning the original document on the original document stand by the image reading portion is not performed, but the image is read from the USB memory 320 (321) (322), and the image data selected by the user is outputted to an output portion.

In FIG. 6, when the "cancellation" key is pressed, reading of the specified file is not performed, and the screen returns to FIG. 5 which is a former hierarchy screen.

In FIG. 5, if the selection "No" which does not read the contents of the USB memory 320 (321) (322) is pressed (touched), access to the USB memory 320 (321) (322) is not performed, and the LED 220 corresponding to the USB memory reading key 221 will be turned-off state. When the start key 201 in the copy function is pressed in this case, like the usual copy, scanning control of an original document is performed to read an image, and the read screen is outputted to the output portion.

[Control Processing at the Time of Connection and Disconnection of a USB Memory]

Next, the processing that the control unit 311 performs when any one of USB memory 320, 321 and 322 are connected to and disconnected from the USB port 20, 21 and 22 will be explained with reference to a flowchart. In the following explanation and drawings, a step is written abbreviated as "S."

Figure 7:
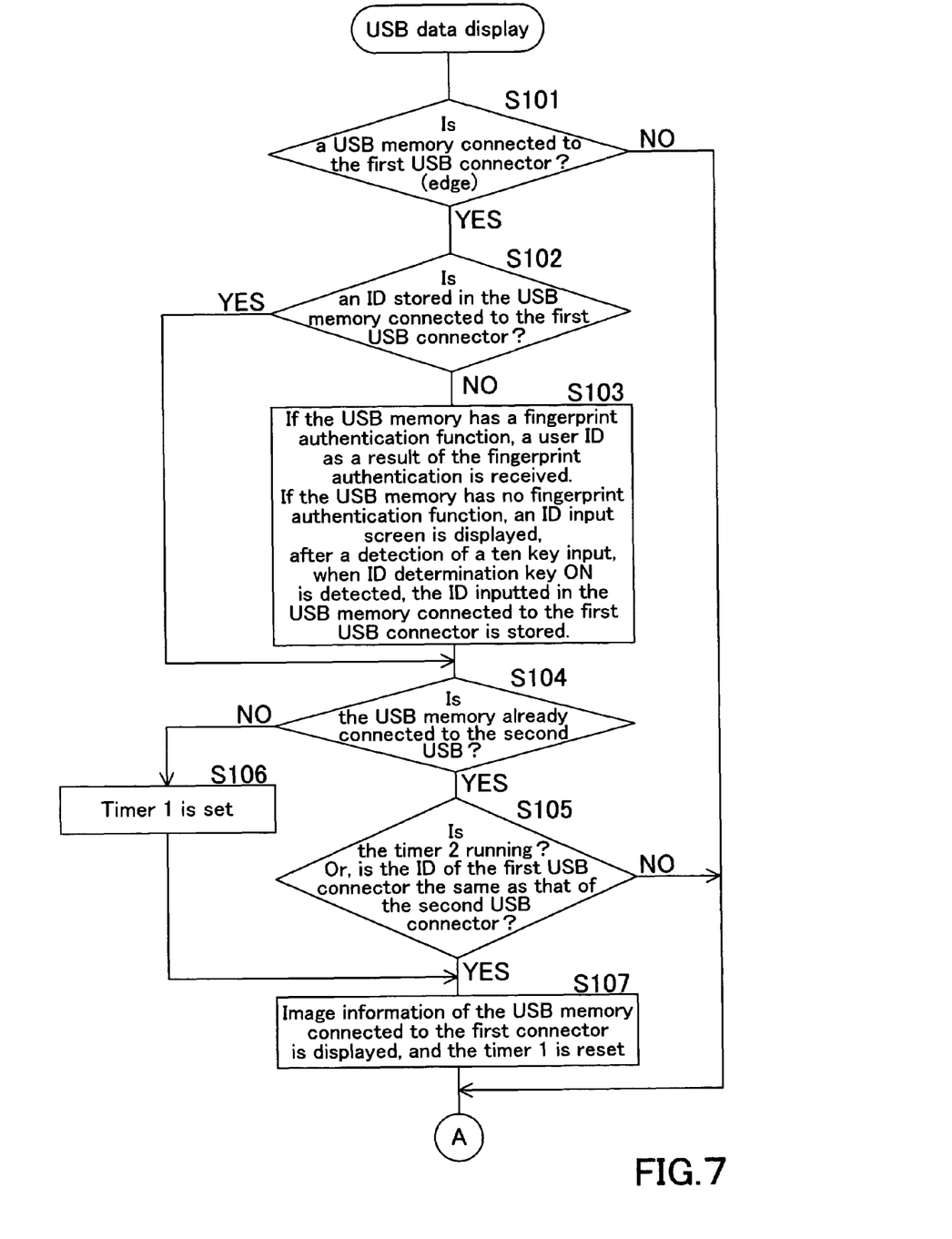
FIG. 7 is a flowchart showing control processing at the time of connecting and disconnecting external storages.

In FIG. 7, at S101, the control unit 311 discriminates whether a USB memory 320 is connected to the first USB port 20 by an edge detection of a signal. If it is discriminated that the USB memory 320 is connected ("Yes" at S101), at S102, it is discriminated whether a user identification information (user ID) is stored in the connected USB memory 320. If the USB memory 320 is not connected ("No" at S101), the routine proceeds to S108.

If no user ID is stored in the USB memory 320 ("No" at 102), the routine proceeds to S104 after performing the next processing at S103.

That is, in cases where a fingerprint authentication portion 330 is provided in the USB memory 320 itself, the user ID of the result obtained by performing fingerprint authentication is received. However, if no fingerprint authentication portion 330 is provided in the USB memory 320, setting of a User ID is performed. The setting input of a user ID is performed by using the control panel 10 shown in FIG. 4, and the display "Ready to copy" in the message column of the touch panel 206 changes to the display "Input your user ID."

When a user inputs arbitrary user ID using the ten key 202 and then presses the ID determination key (for example, stop key) as a determination input, the ten key input and the "ON" of the ID determination key are detected. The user ID will be stored in the USB memory 320 as it is without being displayed.

Thus, since the user ID set and stored in the USB memory 320 is used for an identity judgment of the future active users, the identity judgment can be performed easily.

At S102, if a user ID is stored in the USB memory 320 ("Yes" at S102), the routine proceeds to S104 as it is.

At S104, it is discriminated whether the USB memory 321 is already connected to the second USB port 21. If the USB memory 321 is already connected to the second USB port 21 ("Yes" at S104), at S105, it is discriminated whether the timer 2 by the timer portion 311f is not up, or whether the User ID of the USB memory 320 connected to the first USB port 20 and the User ID of the USB memory 321 already connected to the second USB port 21 are the same or not.

If the timer 2 is not up or if the user IDs are the same ("Yes" at S105), it is discriminated as the same user, and the routine proceeds to S107. The reason why it is discriminated that the user is the same when the timer 2 is not up is as follows. That is, it is considered that one USB memory 321 was connected and immediately the other USB memory 320 side was connected. Therefore, it can be concluded that the same user connected one USB memory 321 and the other USB memory 320 without delay.

At S104, if the USB memory 321 is not connected to the second USB port 21 ("No" at S104), at S106, in order to discriminate whether the following USB memory is connected immediately, the timer 1 of the timer portion 311f is set, and then the routine proceeds to S107. In this case, only the USB memory 320 is connected to the first USB port 20. At S105, if the timer 2 is up and the user IDs are not the same ("No" at S105), the routine proceeds to S108.

At S107, the storage information (for example, image information) on the USB memory 320 connected to first USB port 20 is displayed on the display 12 as shown in FIG. 6, and after resetting the timer 2, the routine proceeds to S108.

Thus, in cases where the user of these two USB memories 320 and 321 is the same or only one USB memory 320 is connected, since the possibility that the displayed storage information is seen by third person other than the user of the USB memory is low, the security can be secured. On the other hand, the user can select a predetermined file from the displayed storage information, enhancing the selection operability.

Furthermore, no storage information will be displayed when the user of the two USB memories 320 and 321 is not the same, and therefore the security can be secured.

In cases where two USB memories 320 and 321 are connected and the user is the same, it can be configured such that not only the storage information in the USB memory 320 but also the storage information in the already connected USB memory 321 are displayed.

Figure 8:
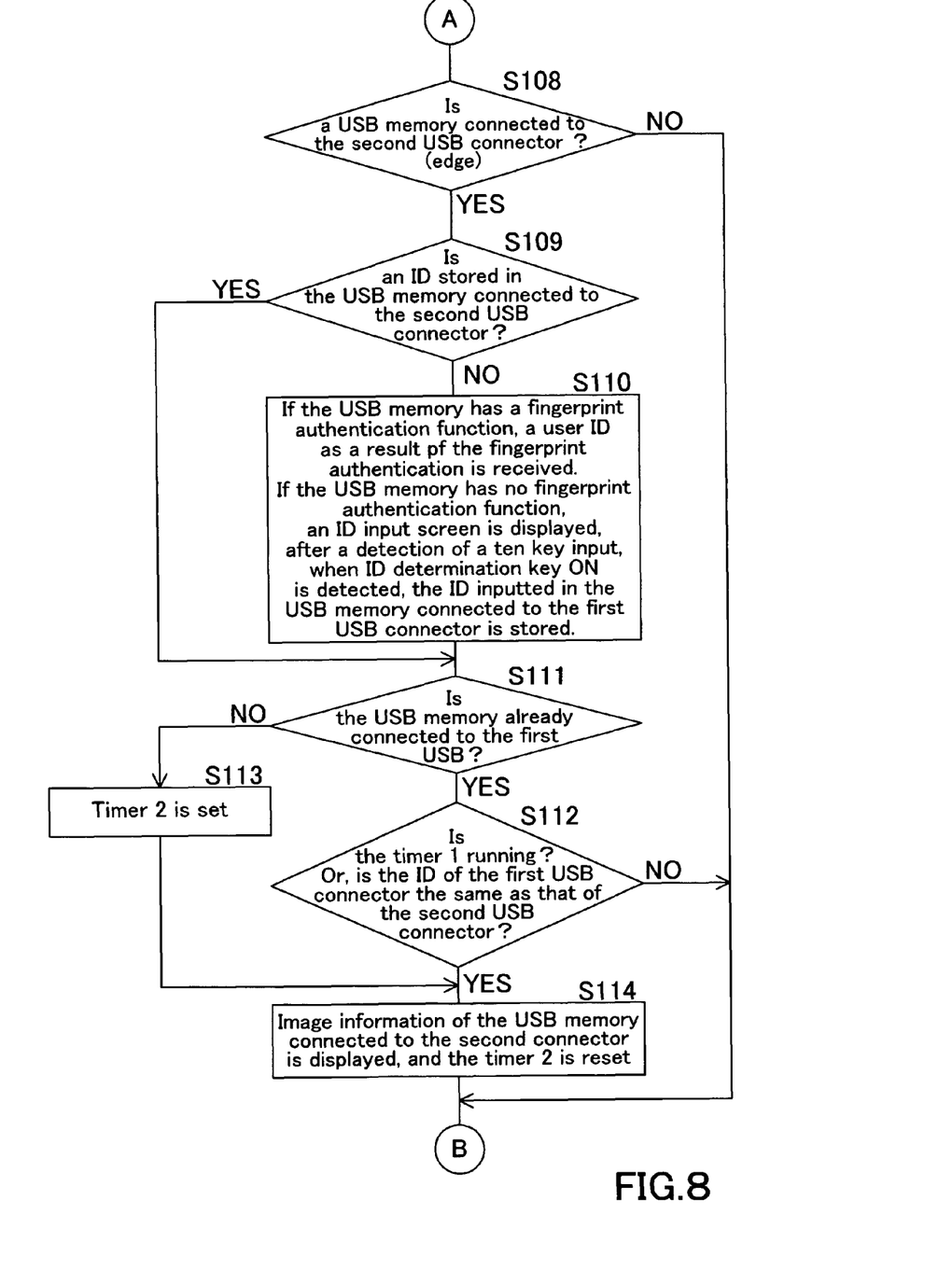
FIG. 8 is a flowchart showing processing continued from FIG. 7.

The steps from S108 to S114 are processing to be performed when the USB memory 321 is connected to the second USB entry 21, and are the same as the steps from S101 to S107 in content.

That is, at S108, it is discriminated whether the USB memory 321 is connected to the second USB port 21 by detecting with an edge. When it is discriminated that the USB memory 321 is connected ("Yes" at S108), at S109, it is discriminated whether a user ID is stored in the USB memory 321. If it is discriminated that the USB memory 321 is not connected ("No" at S108), the routine proceeds to S115.

If no user ID is stored in the USB memory 321 ("No" at S109), the routine proceeds to S111, after performing the next processing at S110.

That is, in cases where a fingerprint authentication portion 330 is provided in the USB memory 321 itself, the user ID of the result of performed fingerprint authentication is received. To the contrary, in cases where no fingerprint authentication portion 330 is provided in the USB memory 320, a user ID input is requested. As for the input of a user ID, since it was explained above, the explanation will be omitted. The inputted user ID is stored in the USB memory 321 as it is without being displayed.

At S109, if a user ID is stored in the USB memory 321 ("Yes" at S109), the routine proceeds to S111 as it is.

At S111, it is discriminated whether the USB memory 320 is already connected to the first USB port 20. If it is discriminated that the USB memory 320 is already connected ("Yes" at S111), at S112, it is discriminated whether the timer 1 by the timer portion 311f is not up, or the user ID of the USB memory 321 connected to the second USB port 21 and the User ID of the USB memory 320 already connected to first USB port 20 are the same.

If the timer 1 is not up or if the user ID is the same ("Yes" at S112), it is discriminated to be the same user and the routine proceeds to S114.

At S111, if the USB memory 320 is not connected to the first USB port 20 ("No" at S111), at S103, in order to discriminate whether the next USB memory was connected immediately, the routine proceeds to S114 after setting the timer 2 of the timer portion 311f. Furthermore, at S112, if the timer 1 is up and the user ID is not the same ("No" at S112), the routine proceeds to S115.

At S114, the storage information in the USB memory 321 connected to the second USB port 21 is displayed on the display 12 as shown in FIG. 6, and the routine proceeds to S115 after resetting the timer 1.

Thus, at the time of connecting the USB memory 321 to the second USB port 21, in the same manner as when the USB memory 320 is connected to the first USB port 20, the memory content of the USB memory 321 is displayed on the display 12.

Next, at S115, it is discriminated whether connection release due to the disconnection of the USB memory 320 connected to the first USB port 20 was detected. If the connection release was detected ("Yes" at S115), the routine proceeds to S116. If not detected ("No" at S115), the routine proceeds to S119.

At S116, it is discriminated whether the USB memory 321 is connected to the second USB port 21. If it is discriminated that it is connected ("Yes" at S116), the routine proceeds to S117. If not connected ("No" at S116), the routine proceeds to S119.

At S117, it is discriminated whether the user ID of the USB memory 320 of the first USB port 20 whose connection is released and the user ID of the USB memory 21 of the second USB port 21 which is still connected are not the same. If the user IDs are the same ("No" at S117), the routine proceeds to S119. If the user IDs differ ("Yes" at S117), at S118, the storage information in the USB memory 321 connected to the second USB port 21 is displayed on the display 12 as shown in FIG. 6, and the routine proceeds to S119.

For example, provided that a user connects the USB memory 320 to the first USB port 20 and then a different user connects the USB memory 321 to the second USB port 21, if the user of the earlier connected USB memory 320 pulls out the USB memory 320 from the first USB port 20, at S118, the storage information in the USB memory 321 later connected to the second USB port 21 will be displayed. This is performed for the purpose of moving the operation right to the next user by considering that the earlier user finished the use of the MFP 1. The next user can just select any one of the displayed storage information, which improves the operability.

Here, if the memory contents of the next user's USB memory 321 connected to the USB port 21 immediately after pulling out the USB memory 320 from the USB port 20 are displayed, there is a possibility that the next user's display may be in sight of the former user. For this reason, at S118, it may be configured such that a counter for counting a predetermined time from the release of the first USB memory is operated and the storage information in the second USB memory is displayed. That is, it can be configured to display the storage information in the next user's USB memory 321 after a predetermined time has passed since the former user pulled out the first USB memory 320. This prevents that the information in the second USB memory is seen by the user of the first USB memory. As a result, for the user of the second USB memory, a leakage of information can be prevented. Furthermore, for the second user, the second user can insert the USB memory in advance, resulting in user friendliness.

Figure 9:
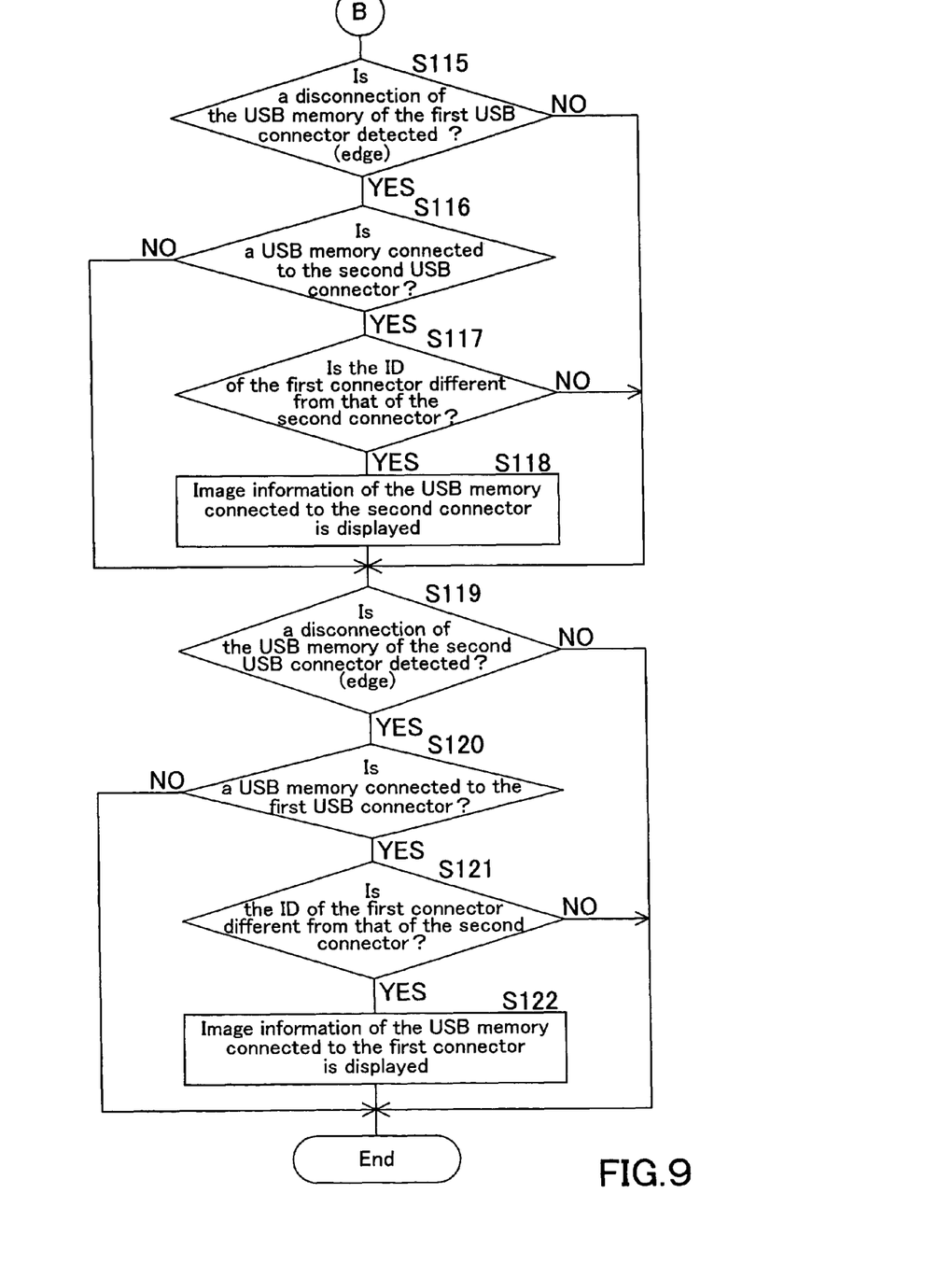
FIG. 9 is a flowchart showing processing continued from FIG. 8.

The steps of S119 to S122 are processing to be performed when the USB memory 321 connected to the second USB port 21 is extracted, and the contents of processing are the same as those of S115 to S118.

That is, at S119, it is discriminated whether the connection release of the USB memory 321 connected to the second USB port 21 is detected. If the connection release is detected ("Yes" at S119), the routine proceeds to S120. To the contrary, if not detected ("No" at S119), the processing will be terminated as it is.

At S120, it is discriminated whether the USB memory 320 is connected to the first USB port 20. If it is discriminated that it is connected ("Yes" at S120), the routine proceeds to S121. However, if not connected ("No" at S120), the processing is terminated.

At S121, it is discriminated whether the User ID of the USB memory 321 of the second USB port 21 whose connection is released and the User ID of the USB memory 320 of the first USB port 20 which is still connected are not the same. If the user IDs are the same ("No" at S121), the processing is terminated. To the contrary, if the user IDs differ from each other ("Yes" at S121), at S122, the storage information in the USB memory 320 connected to the first USB port 20 is displayed on the display 12 as shown in FIG. 6, and the processing is terminated.

Figure 10:
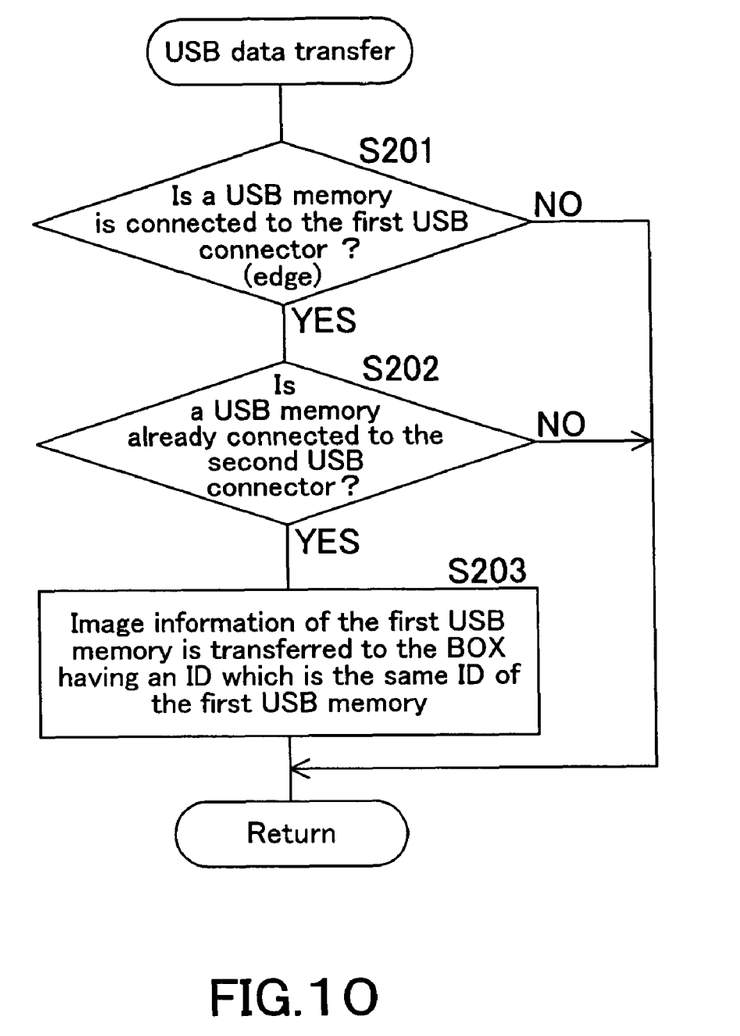
FIG. 10 is a flowchart showing control processing according to another embodiment.

FIG. 10 is a flowchart showing processing to be executed by the control unit 311 which is processing according to an embodiment of the present invention. This embodiment shows the case in which the storage information in a USB memory is transferred to the exclusive storage area (box) 3120 of the storage portion 312 to save therein.

In FIG. 10, at S201, it is discriminated whether the USB memory 320 is connected to the first USB port 20. If it is discriminated that the USB memory 320 is connected ("Yes" at S201), the routine proceeds to S202. If not connected ("No" at S201), it returns as it is.

At S202, it is discriminated whether the USB memory 321 has bee already connected to the second USB port 21. If it is discriminated that the memory has been connected ("Yes" at S202), at S203, the storage information in the newly connected first USB memory 20 is transferred to and stored in the exclusive storage area (box) 3120 classified by the same user ID of the storage portion 312. Then, the routine returns. If the second USB memory 321 is not connected ("No" at S202), the routine returns as it is.

The above can be applied to the case in which the USB memory 321 is connected to the second USB port 21 and the USB memory 320 has been already connected to the first USB port 20.

According to this processing, in the state in which any one of USB memories has been already connected, when another USB memory whose user is different is connected, the memory contents of the later connected another USB memory are transferred to and stored in the exclusive storage area (box) 3120 of the nonvolatile memory 312. For this reason, it becomes possible for a user who dislikes waiting in front of the MFP 1 to send a print instruction to the stored data stored in the exclusive storage area (box) 3120 without reconnecting the USB memory later.

Furthermore, since the storage information is only transferred to the exclusive storage area 3120, and is not displayed on the display 12, security can be secured.

Figure 11:
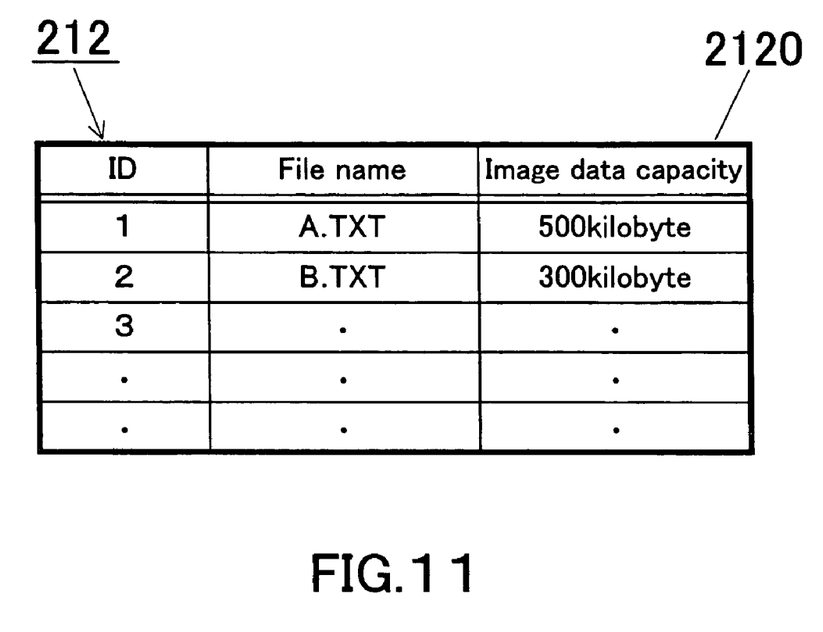
FIG. 11 shows a storage structure of an exclusive storage area (box) in which storage information on external storages is stored.

The exclusive storage area (box) 3120 is provided every user ID as shown in FIG. 11, and can store storage information (e.g., image information) every user ID. For example, in the box of user ID 1, the image information called "A.TXT" is stored with the information correlated with the image data capacity. Although in this embodiment an example in which one image information is stored to the user ID 1, since it is the same user ID in the case of the same user, a plurality of image information can be stored.

Furthermore, it is possible that the image information stored in the exclusive storage area (box) 3120 is displayed on a screen as shown in FIG. 6 and it is possible for a user to print a desired image data by selecting it.

In cases where the image data in the USB memory 320 (321) (322) is graphical data, it can be configured such that the control unit 311 shown in FIG. 3 changes the image form into the image form in which the MFP1 can process and then the changed image form is stored in the area of the user ID.

In the above-mentioned embodiment, USB memories are exemplified as external storages 320 to 322. However, it is also applicable to an external storage, such as a portability hard disk drive unit, an optical disk, and a memory card.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A stored information processing device for external storages, comprising:
    a plurality of connecting portions for connecting a plurality of external storages in a detachable manner;
    a stored information reading portion capable of reading stored information of the external storage connected to the connecting portion;
    a display portion capable of displaying the stored information of the external storage read by the stored information reading portion;
    a detection portion for detecting a connection and/or disconnection of the external storage with respect to any one of the connecting portions;
    a discrimination portion for discriminating whenever a connection and/or disconnection of a first external storage with respect to any one of the connecting portions while the stored information processing device is on is detected by the detection portion, whether a second external storage is connected to the other connecting portion; and
    a controller for determining whether the stored information of the first and/or second external storage is displayed on the display portion depending on a discrimination result.

2. The stored information processing device for external storages as recited in claim 1, wherein the stored information processing device is an image forming apparatus having a printer function or a facsimile function.

3. The stored information processing device for external storages as recited in claim 1, further comprising a user discrimination portion for discriminating a user of the first and second external storages in the case in which the second external storage has been already connected when a connection of the first external storage is detected, wherein the controller permits displaying of the stored information of the first and/or second external storages in cases where it is discriminated that the user of the first external storage and that of the second external storage are the same.

4. The stored information processing device for external storages as recited in claim 1, further comprising a user discrimination portion for discriminating a user of the first and second external storages in the case in which the second external storage has been already connected when a disconnection of the first external storage is detected, wherein the controller permits displaying of the stored information of the second external storage in cases where it is discriminated that the user of the first external storage and that of the second external storage are different.

5. The stored information processing device for external storages as recited in claim 4, wherein the controller has a counter for timing a predetermined time, and permits a display of the second external storage after the predetermined time has passed from a time a disconnection of the first external storage is detected.

6. The stored information processor processing device for external storages as recited in claim 2, further comprising a timer portion for measuring a time from a detection of a connection of the first external storage by the detection portion to a detection of a connection of the second external storage, wherein the controller permits displaying of the stored information of the first and/or second external storages when the measured time measured by the timer portion is not larger than a predetermined time.

7. The stored information processing device for external storages as recited in claim 3 or 4, further comprising an identification information setting portion for setting user's identification information to the external storage, wherein the user discrimination portion discriminates whether users are the same by the identification information.

8. The stored information processing device for external storages as recited in claim 3 or 4, wherein the external storage has an identification portion for identifying a user, and wherein the user discrimination portion discriminates whether the users are the same by the identification portion.

9. A stored information processing device for external storages, comprising:
    a plurality of connecting portions for connecting a plurality of external storages in a detachable manner;
    a stored information reading portion capable of reading stored information of the external storage connected to the connecting portion;

an internal storage portion having an exclusive storage area for storing the stored information of the external storage read by the reading portion;

a detection portion for detecting a connection of the external storage with respect to any one of the connecting portions;

a discrimination portion for discriminating whenever a connection of a first external storage with respect to any one of the connecting portions while the stored information processing device is on is detected by the detection portion, whether a second external storage is connected to the other connecting portion; and a transfer portion for transferring the stored information of the first external storage to an exclusive area of the internal storage portion to store the stored information therein when it is discriminated that the second external storage is already connected.

10. The stored information processing device for external storages as recited in claim 9, wherein the stored information processing device is an image forming apparatus having a printer function or a facsimile function.

11. A stored information processing method for external storages, the method, comprising:

a detecting step of detecting a connection and/or disconnection of a first external storage with respect to any one of connecting portions of a stored information processing device having a plurality of connecting portions;

a discrimination step of discriminating whether, when the connection and/or disconnection of the first external storage is detected by the detection step, a second external storage is connected to another connecting portion while the stored information processing device is on;

a display control step of determining whether the stored information of the first and/or second external storage is displayed on a display portion depending on the discrimination result; and a display step of displaying the stored information of the first and/or second external storage determined to be displayed at the display control step on a display portion.

12. A stored information processing method for external storages, the method, comprising:

a detection step of detecting a connection of a first external storage to any one of connecting portions of a stored information processing device having a plurality of connecting portions;

a discrimination step of discriminating whether a second external storage is already connected to another connecting portion when a connection of the first external storage is detected while the stored information processing device is on by the detection step; and a transfer step of transferring the stored information of the first external storage to an exclusive storage area of an internal storage portion to save the stored information therein when it is discriminated by the discrimination step that the second external storage is already connected.

13. A stored information processing device for external storages, comprising:

a plurality of connecting portions for connecting a plurality of external storages in a detachable manner;

a stored information reading portion capable of reading stored information of the external storage connected to the connecting portion;

a display portion capable of displaying the stored information of the external storage read by the stored information reading portion;

a detection portion for detecting a connection and/or disconnection of the external storage with respect to any one of the connecting portions;

a discrimination portion for discriminating whether, when a connection and/or disconnection of a first external storage with respect to any one of the connecting portions is detected by the detection portion, a second external storage is connected to the other connecting portion;

a controller for determining whether the stored information of the first and/or second external storage is displayed on the display portion depending on a discrimination result; and a user discrimination portion for discriminating a user of the first and second external storages in the case in which the second external storage has been already connected when a disconnection of the first external storage is detected, wherein the controller permits displaying of the stored information of the second external storage in cases where it is discriminated that the user of the first external storage and that of the second external storage are different, and the controller has a counter for timing a predetermined time, and permits a display of the second external storage after the predetermined time has passed from a time a disconnection of the first external storage is detected.

14. A stored information processing device for external storages, comprising:

a plurality of connecting portions for connecting a plurality of external storages in a detachable manner;

a stored information reading portion capable of reading stored information of the external storage connected to the connecting portion;

a display portion capable of displaying the stored information of the external storage read by the stored information reading portion;

a detection portion for detecting a connection and/or disconnection of the external storage with respect to any one of the connecting portions;

a discrimination portion for discriminating whether, when a connection and/or disconnection of a first external storage with respect to any one of the connecting portions is detected by the detection portion, a second external storage is connected to the other connecting portion;

a controller for determining whether the stored information of the first and/or second external storage is displayed on the display portion depending on a discrimination result, and a timer portion for measuring a time from a detection of a connection of the first external storage by the detection portion to a detection of a connection of the second external storage, wherein the controller permits displaying of the stored information of the first and/or second external storages when the measured time measured by the timer portion is not larger than a predetermined time.

* * * * *